United States Patent
Toyoda

[19]

[11] Patent Number: 5,889,606
[45] Date of Patent: Mar. 30, 1999

[54] SCANNING OPTICAL APPARATUS

[75] Inventor: Koji Toyoda, Machida, Japan

[73] Assignee: Canon Kabushiki Kaisha, Toyko, Japan

[21] Appl. No.: 719,634

[22] Filed: Sep. 25, 1996

[30] Foreign Application Priority Data

Sep. 27, 1995 [JP] Japan ................................ 7-273500

[51] Int. Cl.⁶ .................................................. G02B 26/08
[52] U.S. Cl. ......................... 359/215; 359/205; 359/212; 359/216; 359/819; 347/259
[58] Field of Search .................... 359/205–208, 359/212–219, 662, 708, 718, 719, 811, 819; 347/241–245, 256–261, 263

[56] References Cited

U.S. PATENT DOCUMENTS

| | | | |
|---|---|---|---|
| 4,007,471 | 2/1977 | Land et al. ............................. | 354/295 |
| 5,111,340 | 5/1992 | Kashima et al. ....................... | 359/819 |
| 5,191,483 | 3/1993 | Takizawa et al. ...................... | 359/819 |
| 5,280,379 | 1/1994 | Sugiura ................................. | 359/206 |
| 5,486,954 | 1/1996 | Niikawa et al. ....................... | 359/819 |
| 5,521,763 | 5/1996 | Ono et al. ............................. | 359/819 |

FOREIGN PATENT DOCUMENTS 448123  9/1991  European Pat. Off. .

OTHER PUBLICATIONS

A. Arimoto, et al., "Laser Scanning System Using A Rotationally Asymmetric Aspheric Surface", Applied Optics, vol. 30, No. 6, Feb. 20, 1991, pp. 699–704.

Primary Examiner—James Phan
Attorney, Agent, or Firm—Fitzpatrick, Cella Harper & Scinto

[57] ABSTRACT

A scanning optical apparatus includes a light source unit, a deflector for deflectively scanning a light beam from the light source unit, an optical box in which the deflector is accommodated and an optical system for focusing the light beam deflectively scanned by the deflector on a predetermined surface. The optical system is supported by the optical box and having upside-down prevention mechanism which interferes with a predetermined portion of the optical box to prevent upside-down mounting of the optical system.

24 Claims, 11 Drawing Sheets

SCANNING OPTICAL APPARATUS

BACKGROUND OF THE INVENTION

1. Field of the Invention

The present invention relates to a scanning optical apparatus used for an image forming apparatus such as a laser printer or a laser facsimile apparatus.

2. Related Background Art

As shown in FIG. 1, a scanning optical apparatus used for an image forming apparatus such as a laser printer or a laser facsimile apparatus generally comprises a light source unit E which incorporates a semiconductor laser, a collimator lens, and the like, a rotary polygonal mirror R for deflectively scanning a laser beam $L_0$, i.e., a collimated beam emitted from the light source unit E, and an imaging lens system F for forming the deflectively scanned laser beam into an image on a photosensitive material N serving as a recording medium on the surface of a rotary drum. The imaging lens system F has a spherical lens $F_1$ and a toric lens $F_2$. The rotary polygonal mirror R, the spherical lens $F_1$, and the toric lens $F_2$ are accommodated in an optical box H. The light source unit E is mounted on the side wall of the optical box H.

The upper opening of the optical box H is closed by a lid (not shown) after all necessary parts are mounted in the optical box H. A window M for extracting the laser beam defected and scanned by the rotary polygonal mirror R toward the external rotary drum is formed in the bottom wall of the optical box H.

The laser beam $L_0$ emitted from the semiconductor laser of the light source unit E is collimated by the collimator lens in the light source unit E, linearly focused on the reflecting surface of the rotary polygonal mirror R through a cylindrical lens C, reflected downward by a deflecting mirror G through the imaging lens system F, and extracted from the window M of the optical box H toward the rotary drum. With this arrangement, the laser beam formed into an image on the photosensitive material N on the rotary drum is formed into an electrostatic latent image with the main scanning operation by the rotary polygonal mirror R and the sub-scanning operation by rotation of the rotary drum.

The imaging lens system F has a so-called f-θ function of setting the constant scanning speed of a point image formed on the photosensitive material N in the above-described manner. The spherical lens $F_1$ and the toric lens $F_2$ are strictly positioned with respect to the optical path of the laser beam (scanning light beam) scanned by the rotary polygonal mirror R, and then fixed in the optical box H by a known technique such as bonding.

In recent years, inexpensive plastic lenses have been developed as the toric lens $F_2$. A plastic toric lens has an advantage in simplifying the assembly process of the scanning optical apparatus because a positioning projection D is integrally formed at a predetermined position of the toric lens and engaged with positioning pins $P_1$ and $P_2$ standing on the bottom wall of the optical box H, resulting in facilitation of positioning the scanning direction.

According to the above prior art, however, the toric lens has an aspherical shape asymmetrical about its optical axis, i.e., the center of the longitudinal direction, though this asymmetry cannot be easily recognized from the outer appearance. Therefore, the toric lens is often erroneously mounted upside down in the optical box.

Depending on the type of the scanning optical apparatus, the scanning direction of the scanning light beam is reversed to that described above, so that it is sometimes required to mount a toric lens having the f-θ function upside down. When bearing surfaces (reference surfaces) for mounting the lens to the bottom wall of the optical box are formed on both the upper and lower end faces of the toric lens, the toric lens can also be applied to a scanning optical apparatus of another type. For this reason, the application range (application purpose) of the part can be made wide to largely reduce the unit costs of parts. However, when similar bearing surfaces are formed on both the upper and lower end faces of the toric lens, upside-down mounting further increases.

SUMMARY OF THE INVENTION

The present invention has been made in consideration of the above problem of the prior art, and has as its object to provide a scanning optical apparatus capable of preventing upside-down mounting of an imaging lens such as a toric lens to increase the efficiency of the assembly operation.

In order to achieve the above object, according to the present invention, there is provided a scanning optical apparatus comprising scanning means, at least one imaging lens for forming a scanning light beam scanned by the scanning means into an image on a photosensitive material, and support means abutting against a predetermined reference surface of the imaging lens, wherein the imaging lens has upside-down prevention means which interferes with a predetermined portion of the support means to prevent upside-down mounting of the imaging lens.

Preferably, the upside-down prevention means has at least one nib (projection) which projects along the optical axis of the scanning light beam.

The upside-down prevention means may have at least one interference pin which projects in a direction perpendicular to the scanning plane (a section including the optical axis and the scanning direction) of the scanning light beam.

With a pair of reference surfaces opposing each other, the imaging lens can cope with scanning optical apparatuses of two types having opposite scanning directions. With this arrangement, the application range of the imaging lens is widened, and the unit costs of parts are reduced, so that great cost reduction of the scanning optical apparatus can be promoted.

The imaging lens used as an f-θ lens of the scanning optical apparatus generally has an outer appearance symmetrical in both the lateral and vertical directions, and the imaging lens is often erroneously mounted upside down. To prevent this failure, a nib (projection) or an interference pin which interferes with a predetermined portion of the support means is arranged on the imaging lens, thereby preventing upside-down mounting. Therefore, the efficiency of the assembly operation of the scanning optical apparatus can be largely increased, and cost reduction of the scanning optical apparatus can be promoted.

DETAILED DESCRIPTION OF THE PREFERRED EMBODIMENTS

The embodiments of the present invention will be described below with reference to the accompanying drawings.

Figure 1:
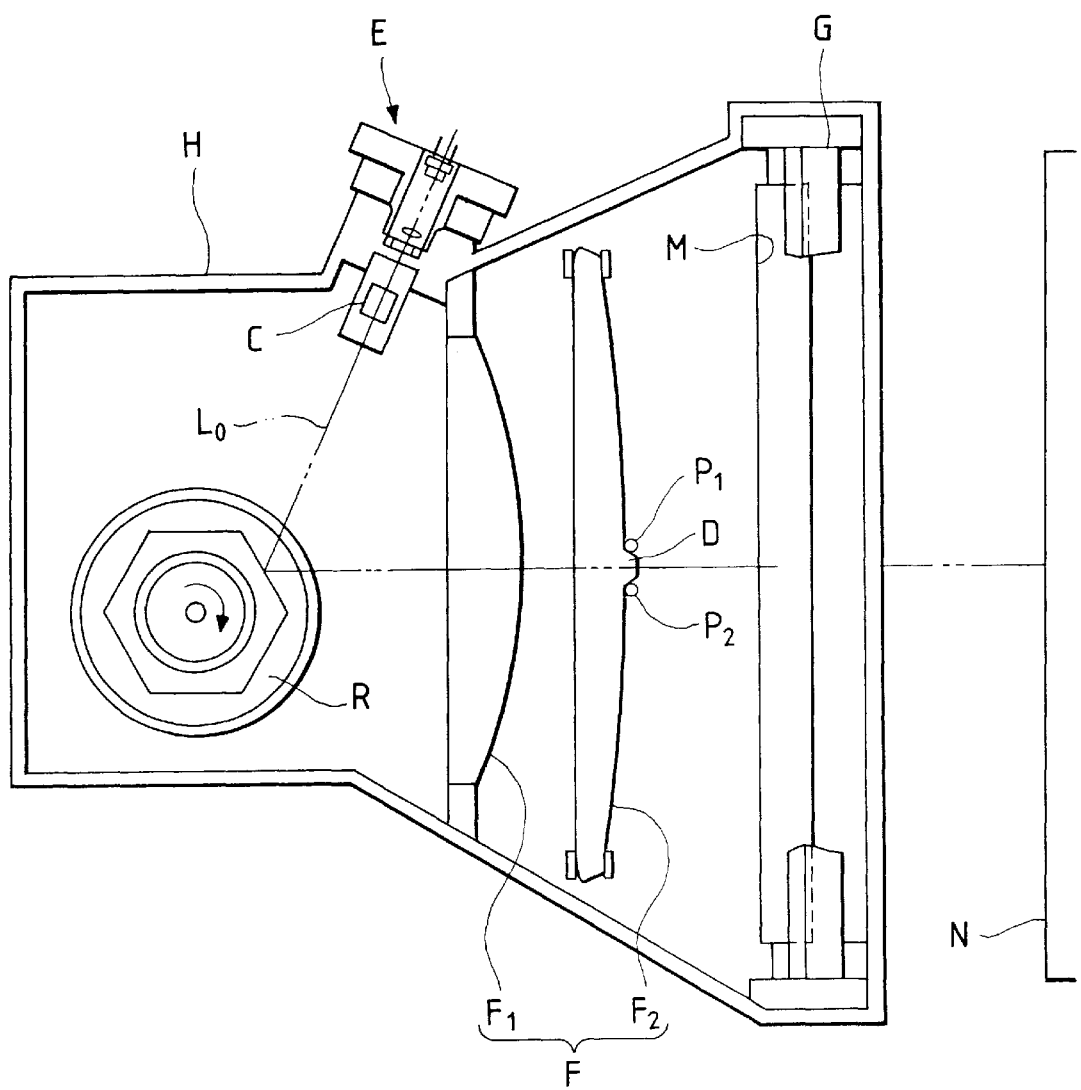
FIG. 1 is a plan view schematically showing a conventional scanning optical apparatus.
Figure 2:
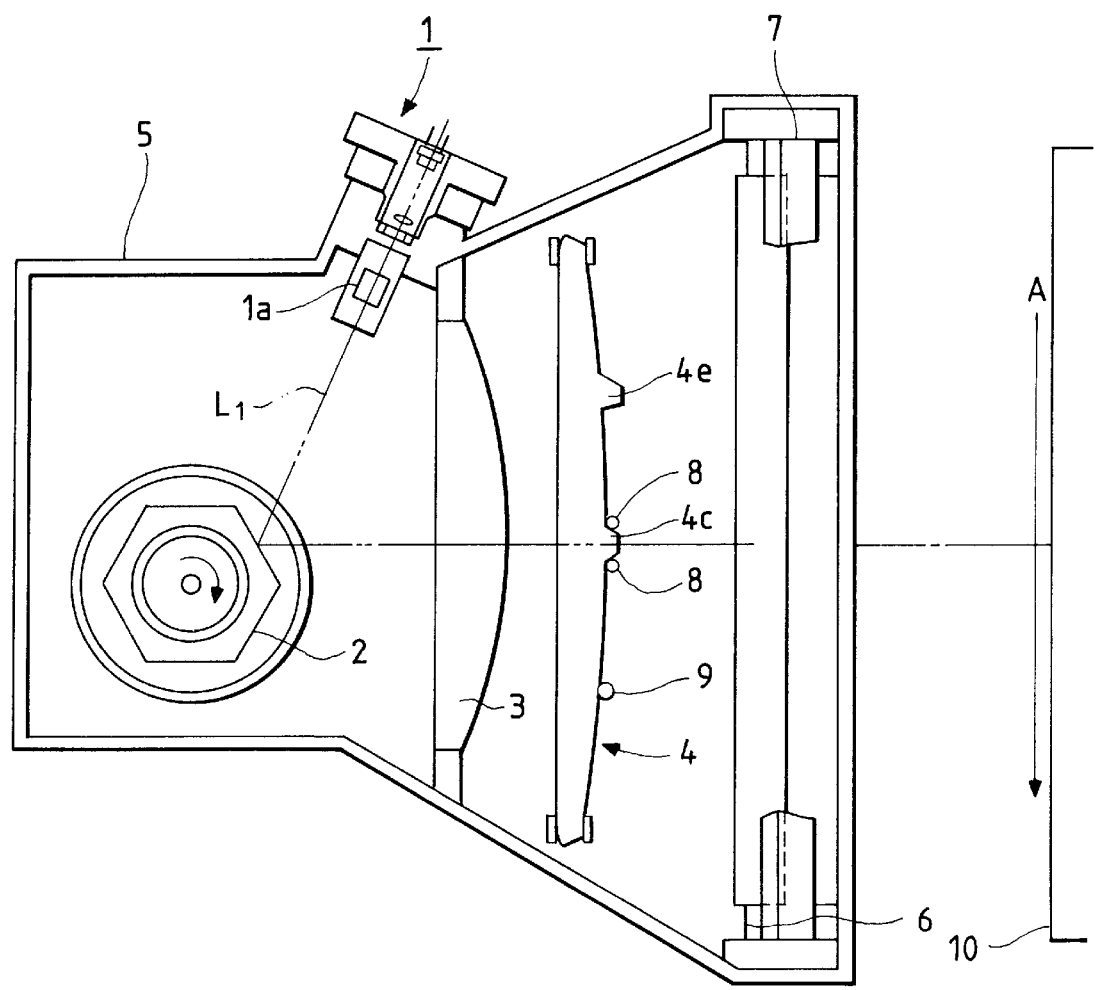
FIG. 2 is a plan view schematically showing a scanning optical apparatus according to the first embodiment of the present invention.

FIG. 2 is a schematic plan view of a scanning optical apparatus according to the first embodiment of the present invention, showing the scanning plane. The scanning optical apparatus comprises a light source unit 1 which incorporates a semiconductor laser, a collimator lens, and the like, a rotary polygonal mirror 2 for deflectively scanning a laser beam $L_1$, i.e., a collimated beam emitted from the light source unit 1, a spherical lens 3 and a toric lens 4 serving as an imaging lens, said spherical lens 3 and toric lens 4 forming the laser beam $L_1$, i.e., a scanning light beam deflectively scanned into an image on a photosensitive material 10 serving as a recording medium on the surface of a rotary drum. The rotary polygonal mirror 2, the spherical lens 3, and the toric lens 4 are accommodated in an optical box 5 serving as a support means. The light source unit 1 is mounted on the side wall of the optical box 5.

The upper opening of the optical box 5 is closed by a lid (not shown) after all necessary parts are mounted in the optical box 5. A window 6 for extracting the laser beam $L_1$ defected and scanned by the rotary polygonal mirror 2 toward the external rotary drum is formed in the bottom wall of the optical box 5.

The laser beam $L_1$ emitted from the semiconductor laser of the light source unit 1 is collimated by the collimator lens in the light source unit 1, linearly focused on the reflecting surface of the rotary polygonal mirror 2 through a cylindrical lens 1a, reflected downward by a deflecting mirror 7 through the spherical lens 3 and the toric lens 4, and extracted from the window 6 of the optical box 5 toward the rotary drum. With this arrangement, the laser beam formed into an image on the photosensitive material 10 on the rotary drum is formed into an electrostatic latent image with the main scanning operation by the rotary polygonal mirror 2 and the sub-scanning operation of rotation by the rotary drum. An arrow A represents the direction of the laser beam scanned upon rotation of the rotary polygonal mirror 2.

Figure 3A:
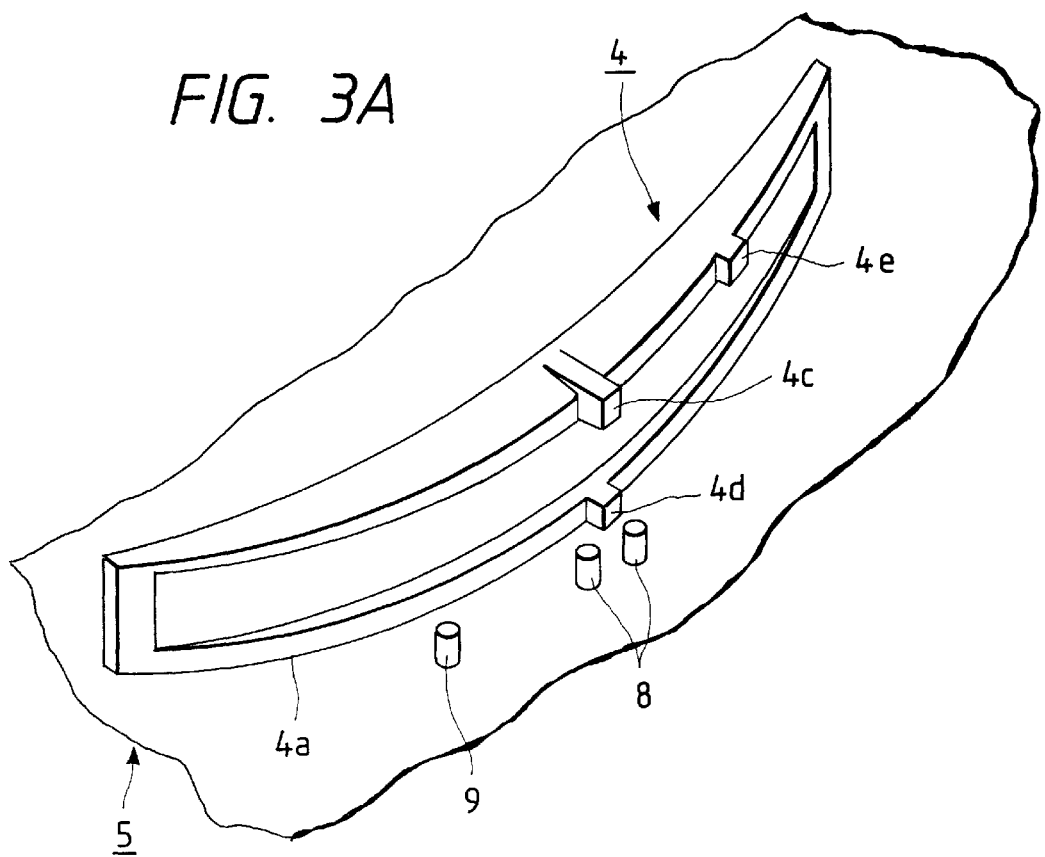
FIGS. 3A and 3B are a perspective view and an elevation, respectively, showing a state immediately before a toric lens according to the first embodiment is mounted in an optical box.
Figure 3B:
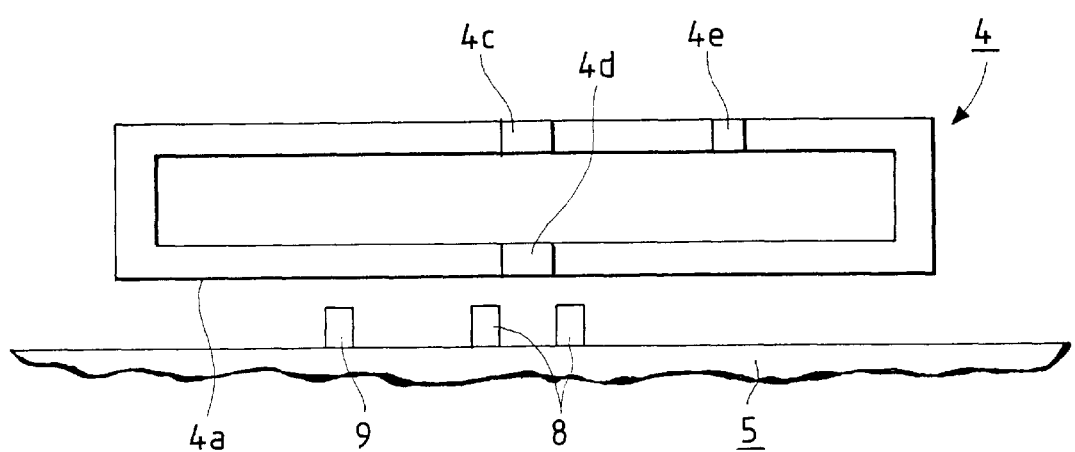

The spherical lens 3 and the toric lens 4 have a so-called f-θ function of setting the constant scanning speed of a point image formed on the photosensitive material 10 in the above-described manner. The toric lens 4 is an aspherical lens which is asymmetrical about the center of its longitudinal direction, i.e., the optical axis and integrally formed of a plastic. As shown in FIGS. 3A and 3B, the lower end face of the toric lens 4 is formed to have a high surface accuracy as a reference surface 4a for positioning. When the reference surface 4a abuts against the bottom wall of the optical box 5, the toric lens 4 is supported. The reference surface 4a is formed to be parallel to the optical axis and scanning direction of the toric lens 4.

A pair of upper and lower projection portions 4c and 4d for positioning the scanning direction are provided near the optical axis, i.e., the center of the longitudinal direction of the toric lens 4. In this embodiment, the lower projection portion 4d is locked between a pair of positioning pins 8 standing on the bottom wall of the optical box 5, thereby positioning the scanning direction of the toric lens 4. The longitudinal direction of the toric lens 4 substantially matches the scanning direction of the laser beam.

However, the asymmetry of the toric lens 4 about the optical axis can hardly be recognized from the outer appearance. For this reason, so-called upside-down mounting often occurs, in which the toric lens erroneously mounted upside down. To prevent such a failure, an interference pin 9 for preventing the upside-down mounting is arranged on the bottom wall of the optical box 5. In addition, a nib (projection) 4e serving as an upside-down prevention means which projects along the optical axis is provided at the upper end (near the upper end face) of the toric lens 4. With this arrangement, when the toric lens 4 is to be mounted upside down, the nib (projection) 4e is engaged with the interference pin 9, so that the upside-down mounted state can be detected. Therefore, the efficiency of the assembly operation of the scanning optical apparatus can be increased, and the manufacturing cost of the scanning optical apparatus can be largely reduced.

Figure 4A:
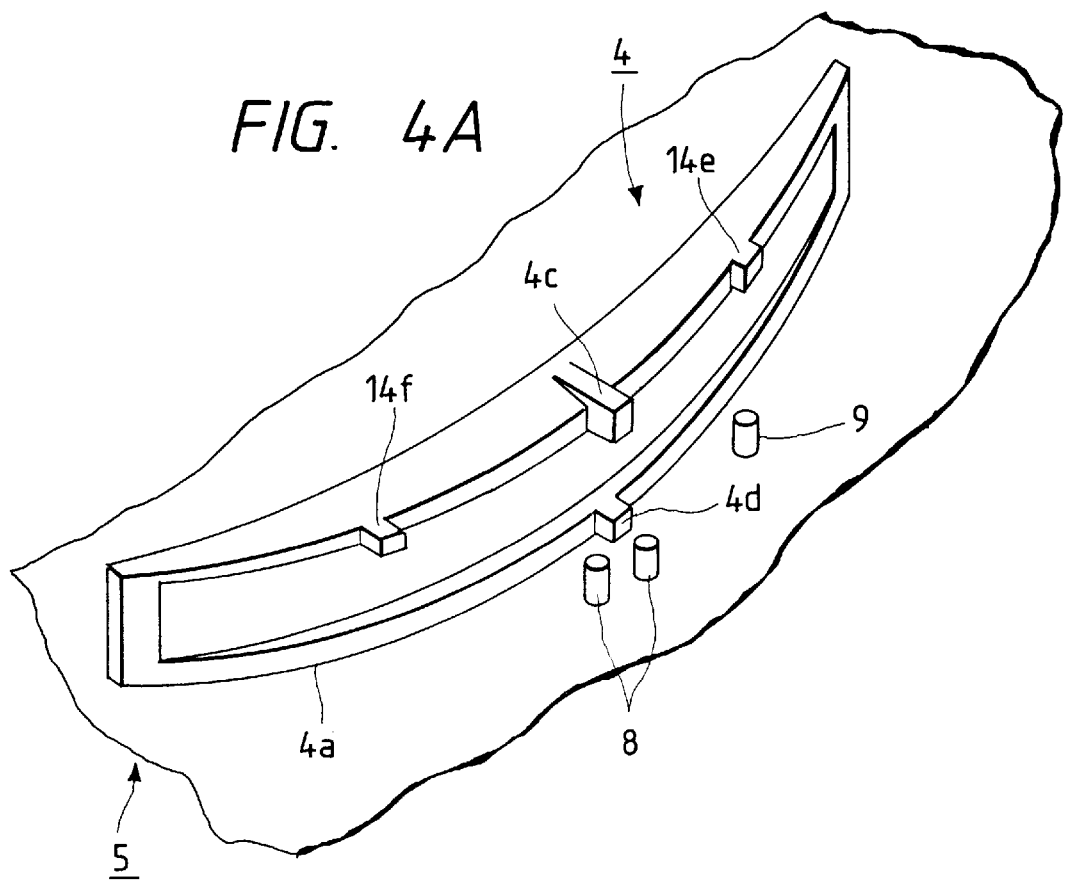
FIGS. 4A and 4B are a perspective view and an elevation, respectively, showing a state immediately before a toric lens used for a scanning optical apparatus according to the second embodiment of the present invention is mounted in an optical box.
Figure 4B:
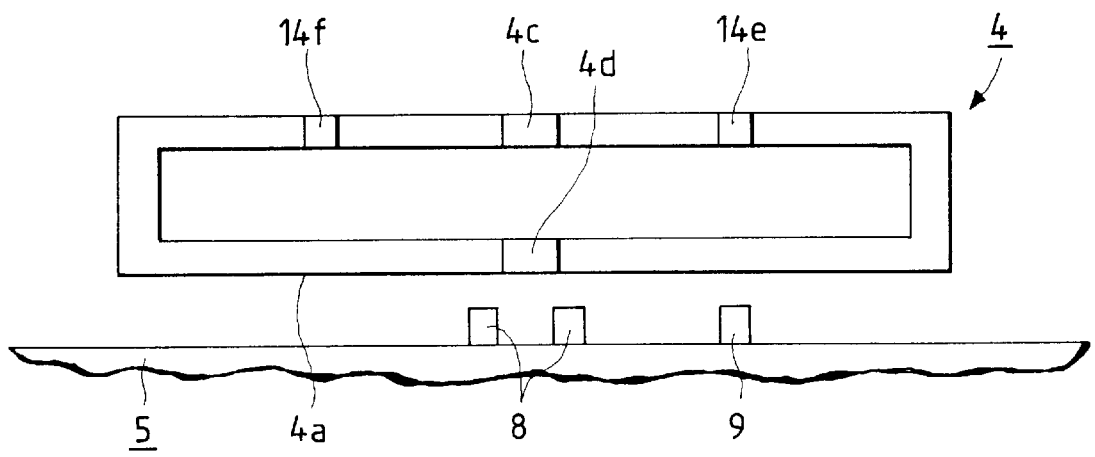

FIGS. 4A and 4B are a perspective view and an elevation, respectively, showing a scanning optical apparatus according to the second embodiment of the present invention. The overall arrangement of the apparatus is the same as that of the first embodiment, and a detailed description thereof will be omitted. Only the arrangement near a toric lens is shown.

As shown in FIGS. 4A and 4B, a pair of left and right nibs (projections) 14e and 14f are arranged at the upper end (near the upper end face) of a toric lens 4, which are separated from each other in the scanning direction and arranged on both sides of the optical axis. This arrangement can be applied to a scanning optical apparatus in which an interference pin 9 is arranged on the opposite side of the optical axis.

Figure 5A:
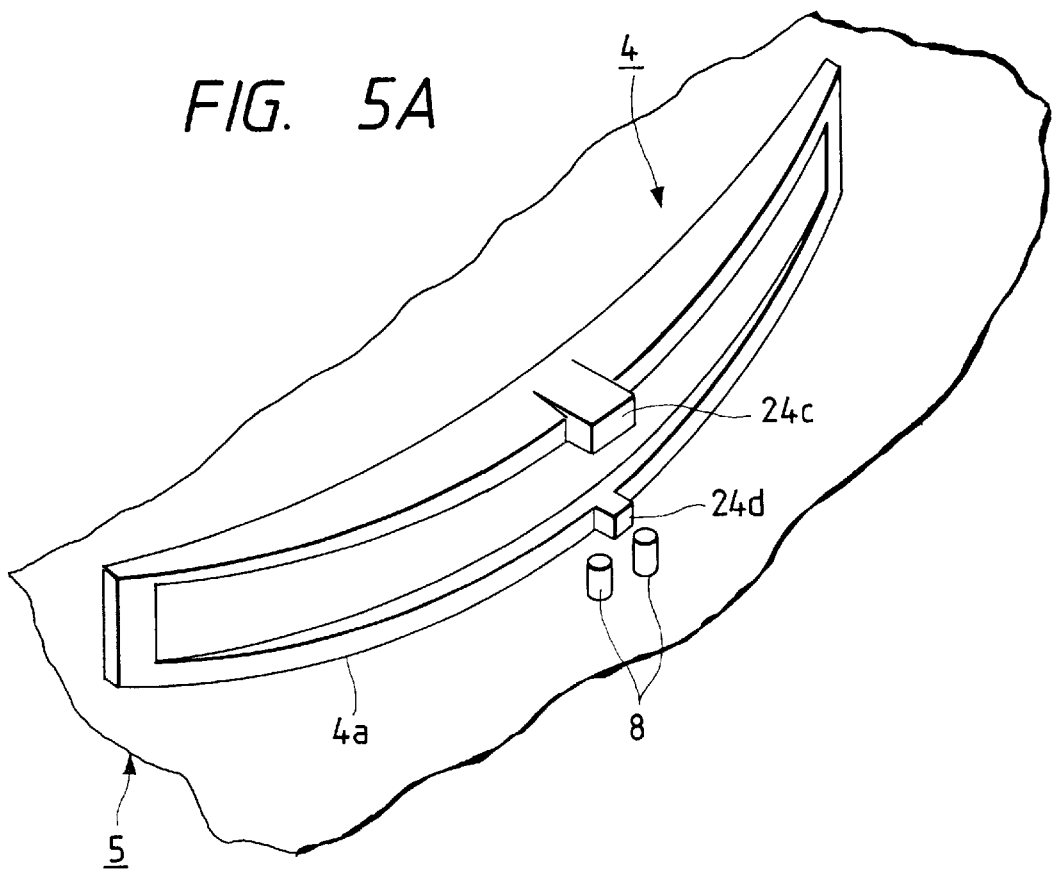
FIGS. 5A and 5B are a perspective view and an elevation, respectively, showing a state immediately before a toric lens used for a scanning optical apparatus according to the third embodiment of the present invention is mounted in an optical box.
Figure 5B:
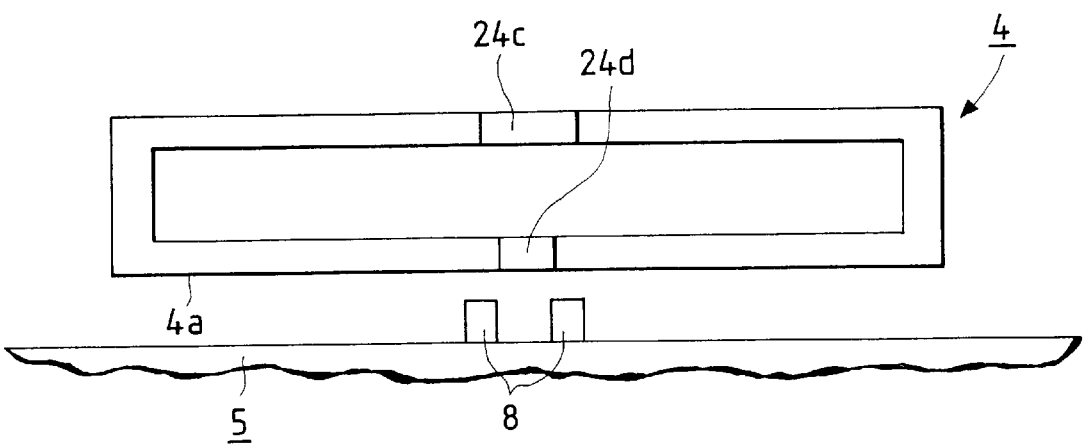

FIGS. 5A and 5B are a perspective view and an elevation, respectively, showing a scanning optical apparatus according to the third embodiment of the present invention. The overall arrangement of the apparatus is the same as that of the first embodiment, and a detailed description thereof will be omitted. Only the arrangement near a toric lens is shown.

As shown in FIGS. 5A and 5B, when the widths of positioning projection portions 24c and 24d provided near the optical axis, which serve as means for positioning the scanning direction, are made different, upside-down mounting of a toric lens 4 can be prevented. In this case, neither interference pin nor nib is necessary for preventing upside-down mounting, so that the toric lens 4 or an optical box 5 can be easily manufactured.

In the first to third embodiments, the arrangement for preventing upside-down mounting by providing the reference surface 4a only on the lower end face of the toric lens has been described.

In the following fourth to sixth embodiments, both the upper and lower end faces of the toric lens 4 are formed to have a high surface accuracy as reference surfaces 4a and 4b for positioning. This arrangement can cope with both a scanning optical apparatus in which the scanning light beam of the rotary polygonal mirror 2 is directed to the right side of the drawing and a scanning optical apparatus in which the scanning light is directed to the left side, and also prevent upside-down mounting of the toric lens.

The reference surfaces 4a and 4b are formed to be parallel to the optical axis of a toric lens 4 and the scanning direction.

When the toric lens 4 can be applied to scanning optical apparatuses of different types, the unit cost of the toric lens 4 can be largely reduced, so that cost reduction of the scanning optical apparatus is promoted.

FIGS. 6A and 7A and FIGS. 6B and 7B are perspective views and elevations, respectively, showing a scanning optical apparatus according to the fourth embodiment of the present invention. The overall arrangement of the apparatus is the same as that of the first embodiment, and a detailed description thereof will be omitted. Only the arrangement near a toric lens is shown.

The upper and lower end faces of a toric lens 4 are formed to have a high surface accuracy as reference surfaces 4a and 4b for positioning.

Even when two reference surfaces are properly used depending on the scanning optical apparatus, upside-down mounting of the toric lens 4 must be prevented. For this purpose, as shown in FIGS. 6A, 6B, 7A, and 7B, nibs (projections) 34e and 34f are arranged at a pair of portions separated from each other in the vertical direction of the toric lens 4, i.e., in a direction perpendicular to the scanning plane (a section including the optical axis and the scanning direction). That is, the toric lens 4 has, at its upper end (near the upper end face) and lower end (near the lower end face), projections which project along the optical axis.

Figure 6A:
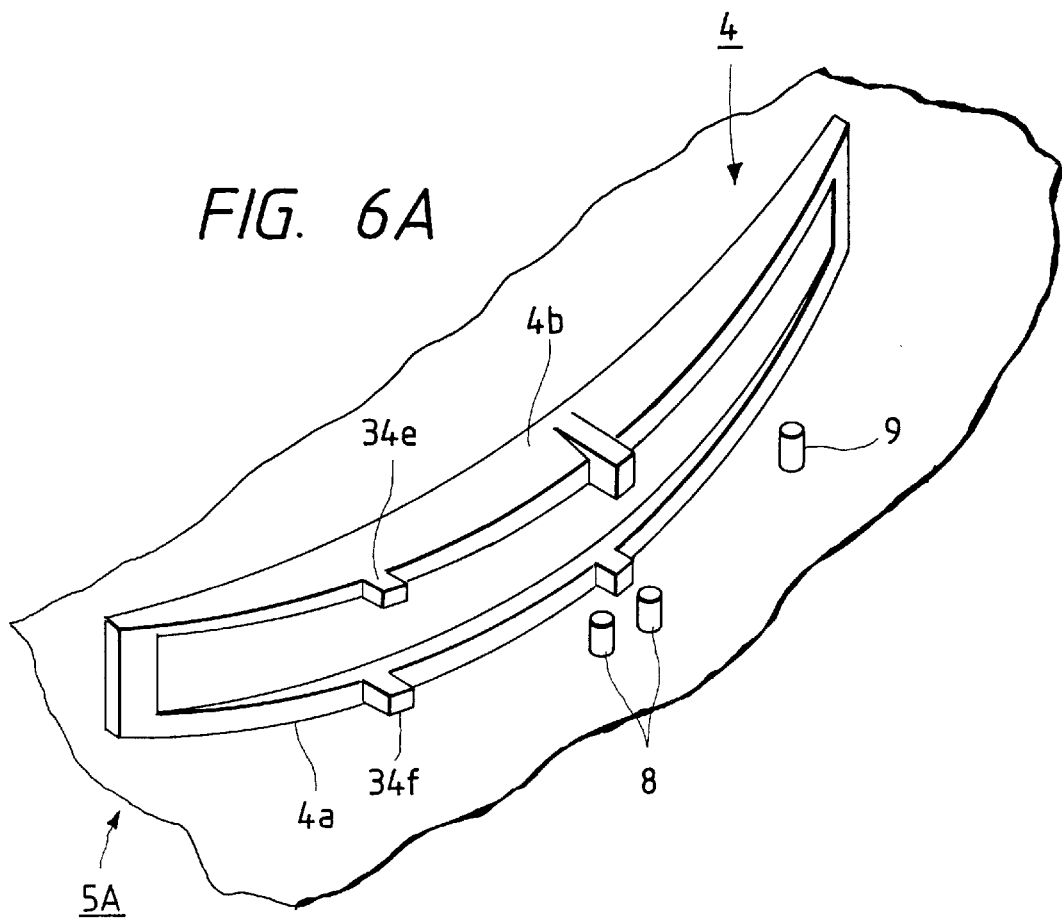
FIGS. 6A and 7A and FIGS. 6B and 7B are perspective views and elevations, respectively, showing a state immediately before a toric lens used for a scanning optical apparatus according to the fourth embodiment of the present invention is mounted in an optical box.
Figure 6B:
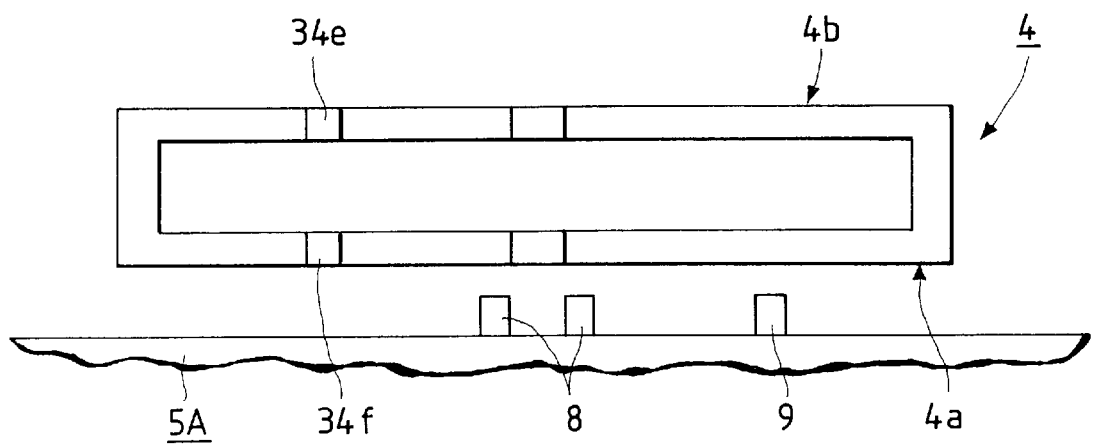
Figure 7A:
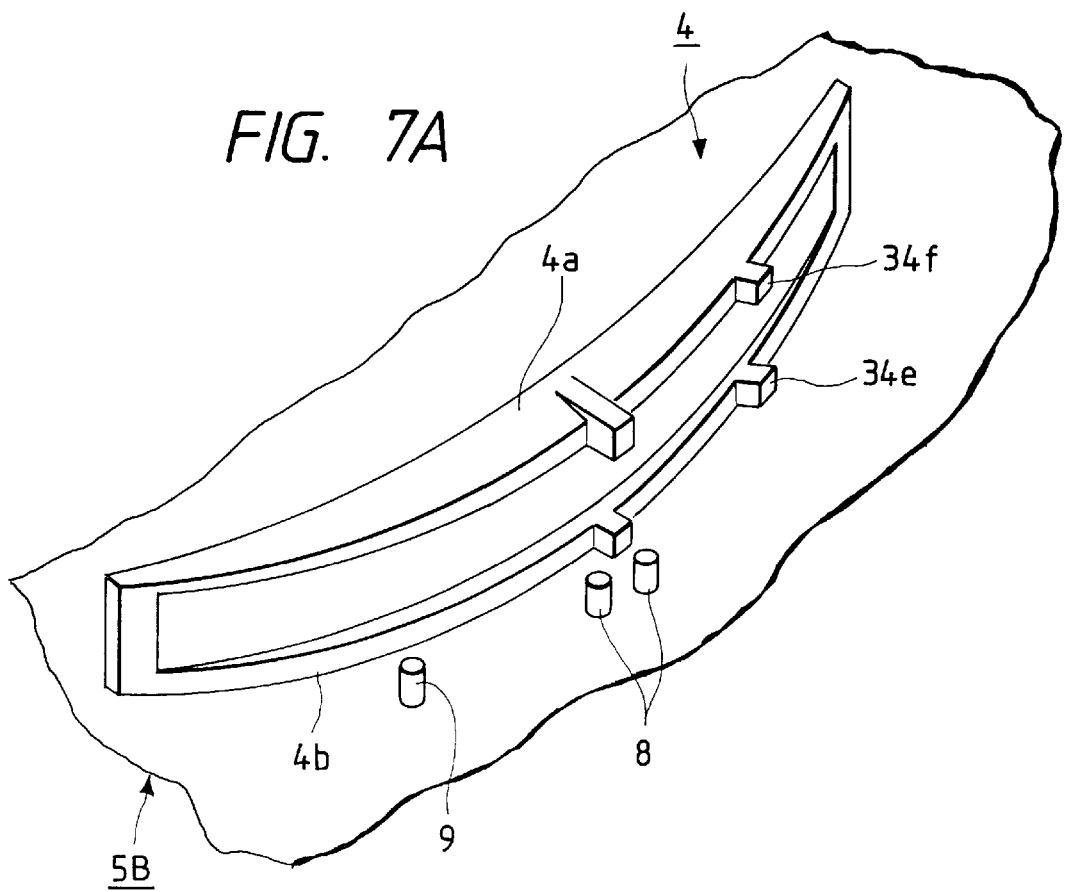
Figure 7B:
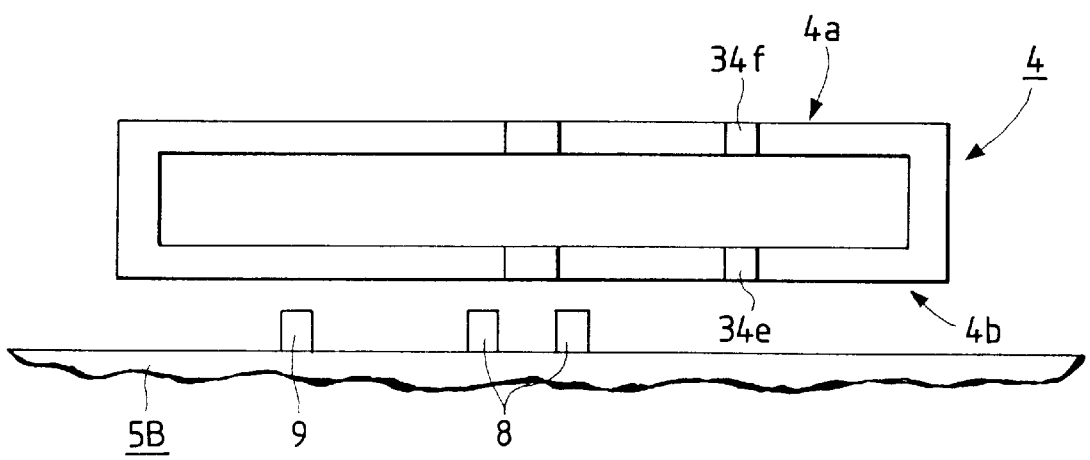

FIGS. 6A and 6B show a state in which the toric lens 4 is mounted in an optical box 5A by using the reference surface 4a. FIGS. 7A and 7B show a state in which the toric lens 4 is mounted in an optical box 5B by using the reference surface 4b. In both the cases, when the toric lens 4 is mounted upside down, the nib and the interference pin interfere with each other.

FIGS. 8A and 9A and FIGS. 8B and 9B are perspective views and elevations, respectively, showing a scanning optical apparatus according to the fifth embodiment of the present invention. The overall arrangement of the apparatus is the same as that of the first embodiment, and a detailed description thereof will be omitted. Only the arrangement near a toric lens is shown.

The upper and lower end faces of a toric lens 4 are formed to have a high surface accuracy as reference surfaces 4a and 4b for positioning.

As shown in FIGS. 8A, 8B, 9A, and 9B, the toric lens 4 has a pair of upper and lower nibs 44e and 44f which are separated from the optical axis by different distances. With this arrangement, it becomes clearer that this arrangement prevents apparatuses of different types from upside-down mounting.

Figure 8A:
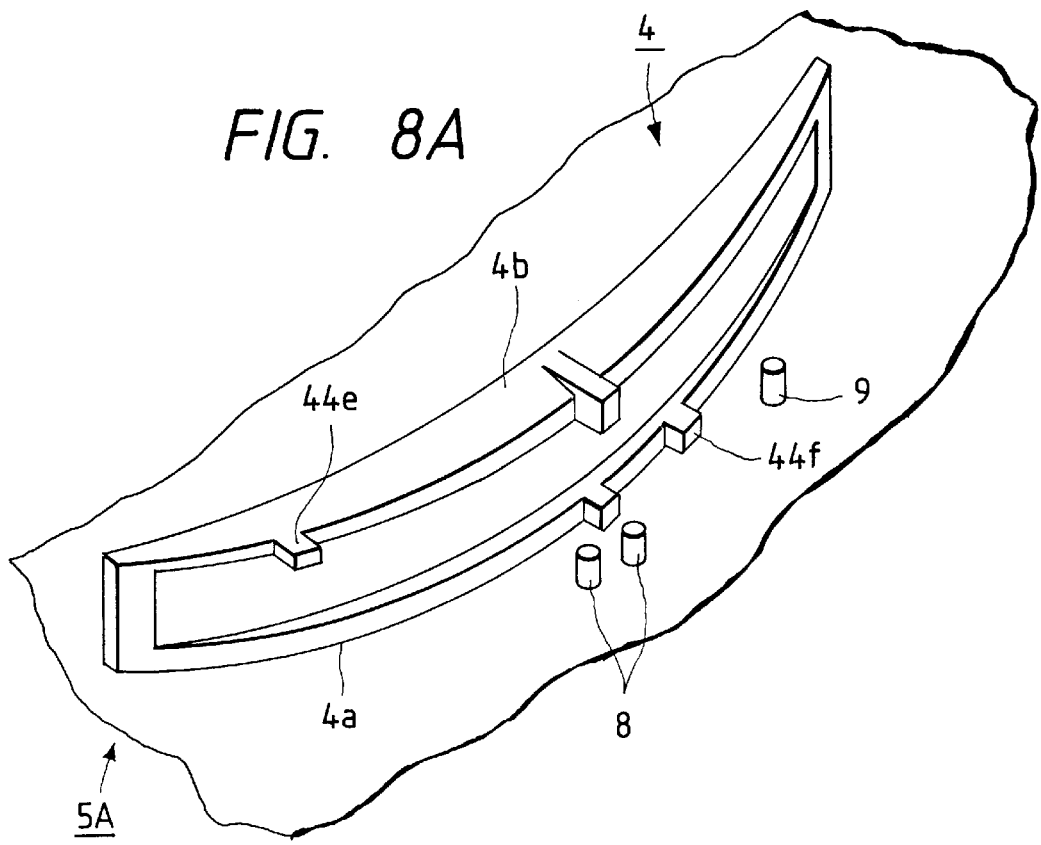
FIGS. 8A and 9A and FIGS. 8B and 9B are perspective views and elevations, respectively, showing a state immediately before a toric lens used for a scanning optical apparatus according to the fifth embodiment of the present invention is mounted in an optical box.
Figure 8B:
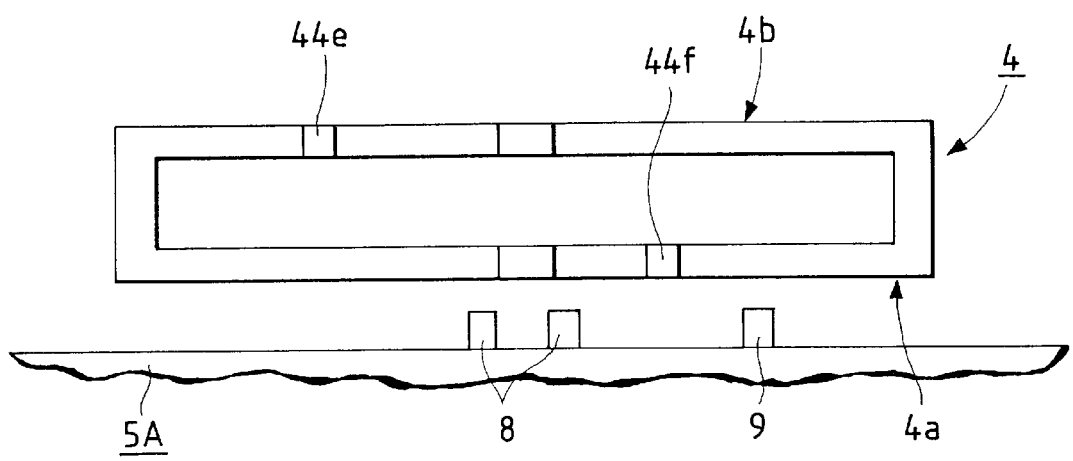
Figure 9A:
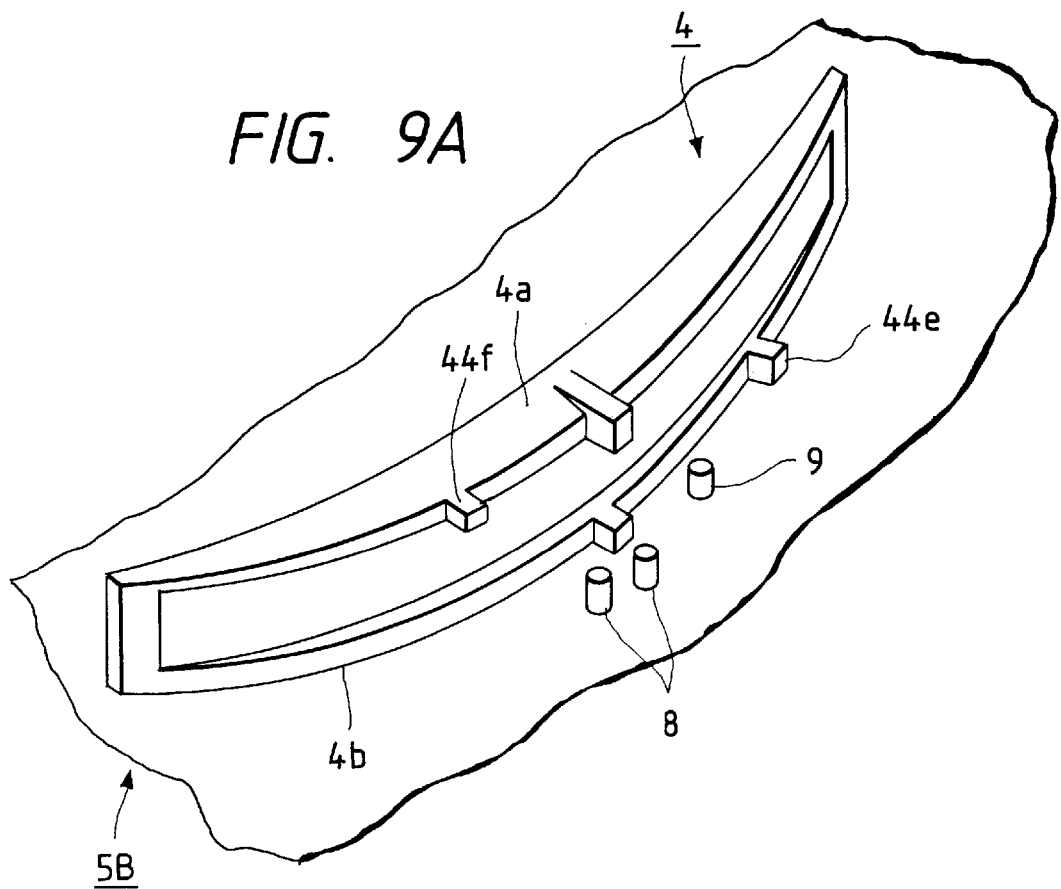
Figure 9B:
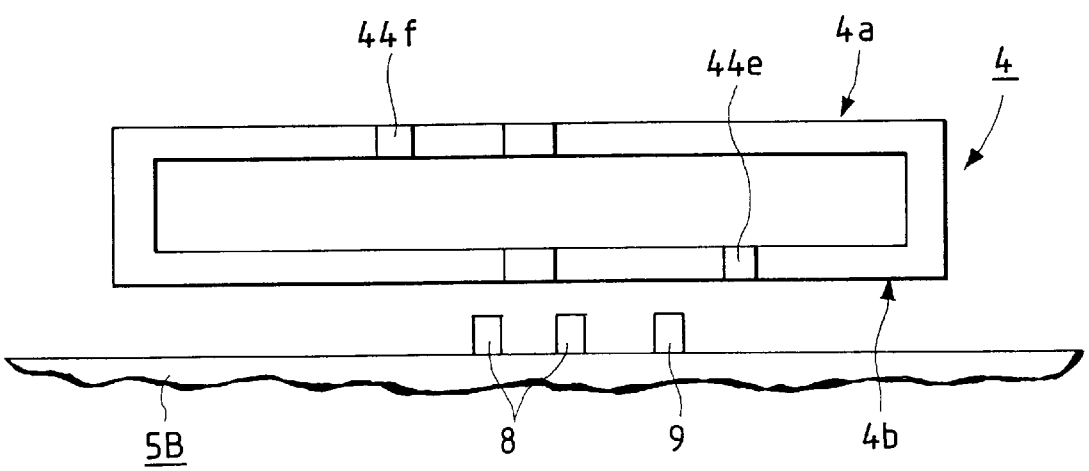

FIGS. 8A and 8B show a state in which the toric lens 4 is mounted in an optical box 5A by using the reference surface 4a. FIGS. 9A and 9B show a state in which the toric lens 4 is mounted in an optical box 5B by using the reference surface 4b. In both the cases, when the toric lens 4 is mounted upside down, the nib and the interference pin interfere with each other.

FIGS. 10A and 11A and FIGS. 10B and 11B are perspective views and elevations, respectively, showing a scanning optical apparatus according to the sixth embodiment of the present invention. The overall arrangement of the apparatus is the same as that of the first embodiment, and a detailed description thereof will be omitted. Only the arrangement near a toric lens is shown.

The upper and lower end faces of a toric lens 4 are formed to have a high surface accuracy as reference surfaces 4a and 4b for positioning.

As shown in FIGS. 10A, 10B, 11A, and 11B, the toric lens 4 has a first pair of interference pins 59a arranged on the reference surface 4a side, and a second pair of interference pins 59b arranged on the reference surface 4b side and have an interval different from that between the first interference pins 59a.

The interference pins 59a and 59b project from the upper and lower end faces of the toric lens 4 in a direction perpendicular to the scanning plane.

Figure 10A:
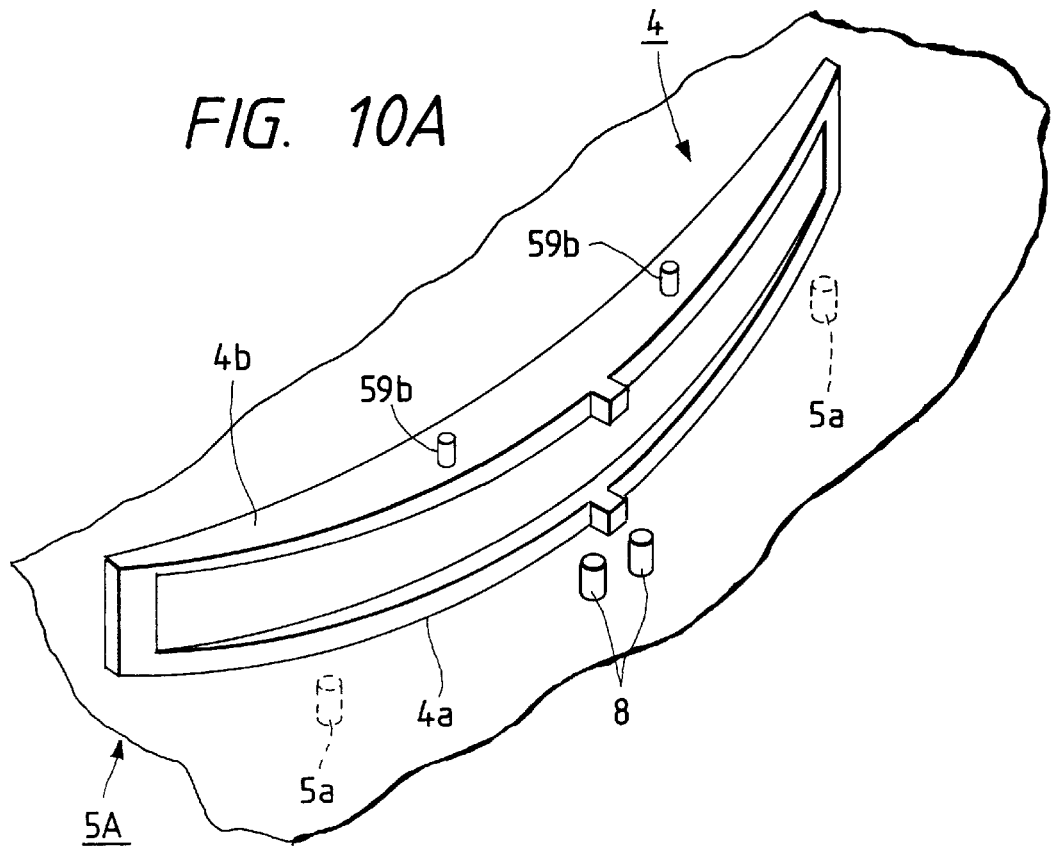
FIGS. 10A and 11A and FIGS. 10B and 11B are perspective views and elevations, respectively, showing a state immediately before a toric lens used for a scanning optical apparatus according to the sixth embodiment of the present invention is mounted in an optical box.
Figure 10B:
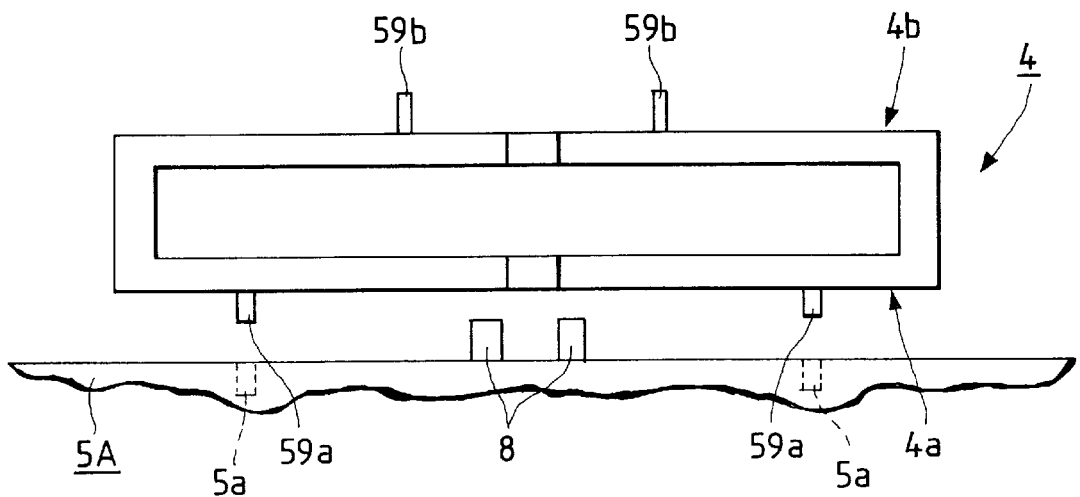
Figure 11A:
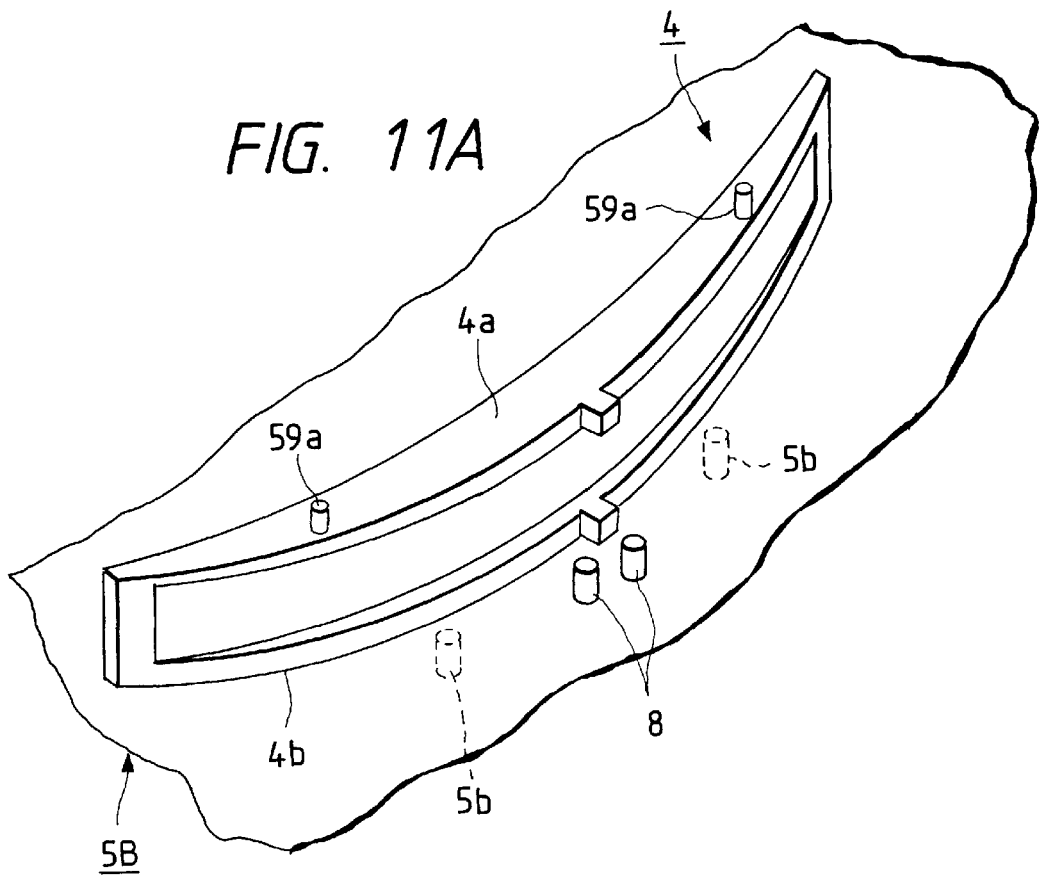
Figure 11B:
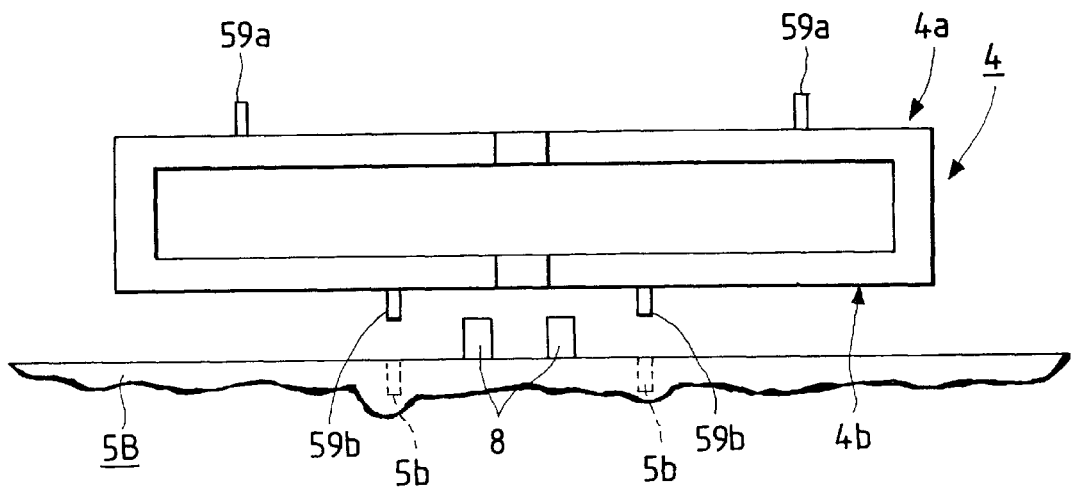

FIGS. 10A and 10B show a state in which the toric lens 4 is mounted in an optical box 5A by using the reference surface 4a. Holes 5a engaged with the interference pins 59a are formed in the bottom wall of the optical box 5A. FIGS. 11A and 11B show a state in which the toric lens 4 is mounted in an optical box 5B by using the reference surface 4b. Holes 5b engaged with the interference pins 59b are formed in the bottom wall of the optical box 5B. In both the cases, when the toric lens 4 is mounted upside down, the bottom wall of the optical box and the interference pins interfere with each other.

With the above-described arrangements, the present invention obtains the following effects.

By reducing the unit cost of the imaging lens such as a toric lens or increasing the efficiency of the assembly operation, cost reduction of the scanning optical apparatus is promoted.

The upside-down prevention projections or interference pins are provided to the imaging lens. With this arrangement, upside-down mounting of the imaging lens can be avoided, and the efficiency of the assembly operation of the scanning optical apparatus can be increased, resulting in a large decrease in manufacturing cost of the scanning optical apparatus.

In addition, when the reference surfaces are provided on both the upper and lower end faces, the application range of the imaging lens is widened, and the unit costs of parts are reduced, so that cost reduction of the scanning optical apparatus can be promoted.

What is claimed is:

1. A scanning optical apparatus comprising:
   a light source unit;
   a deflector for deflectively scanning a light beam from said light source unit;
   an optical box in which said deflector is accommodated; and
   an optical system for focusing the light beam defectively scanned by said deflector on a predetermined surface, and optical system being supported by said optical box and having upside-down prevention means which interferes with a predetermined portion of said optical box to prevent upside-down mounting of said optical system, said upside-down prevention means including at least one projection which projects in a direction parallel to a scanning plane, which includes an optical axis and a scanning direction.

2. An apparatus according to claim 1, wherein said optical system has, on upper and lower end faces parallel to the optical axis and the scanning direction, reference surfaces supported by said optical box.

3. An apparatus according to claim 1, wherein said upside-down prevention means has at least one projection which projects along the optical axis.

4. An apparatus according to claim 1, wherein said upside-down prevention means has a pair of projections separated from each other in the scanning direction.

5. An apparatus according to claim 1, wherein said upside-down prevention means comprises a projection portion for positioning, which is arranged near the optical axis.

6. An apparatus according to claim 1, wherein said upside-down prevention means has a pair of projections separated in a direction perpendicular to the scanning plane.

7. A laser printer apparatus comprising:

a light source unit;

a deflector for deflectively scanning a light beam from said light source unit;

an optical box in which said deflector is accommodated;

an optical system for focusing the light beam deflectively scanned by said deflector on a predetermined surface, said optical system being supported by said optical box and having upside-down prevention means which interferes with a predetermined portion of said optical box to prevent upside-down mounting of said optical system, said upside-down prevention means including at least one projection which projects in a direction parallel to a scanning plane, which includes an optical axis and a scanning direction; and a photosensitive material for receiving the light beam deflectively scanned by said deflector.

8. An apparatus according to claim 7, wherein said optical system has, on upper and lower end faces parallel to the optical axis and the scanning direction, reference surfaces supported by said optical box.

9. An apparatus according to claim 7, wherein said upside-down prevention means has at least one projection which projects along the optical axis.

10. An apparatus according to claim 7, wherein said upside-down prevention means has a pair of projections separated from each other in the scanning direction.

11. An apparatus according to claim 7, wherein said upside-down prevention means comprises a projection portion for positioning, which is arranged near the optical axis.

12. An apparatus according to claim 7, wherein said upside-down prevention means has a pair of projections separated in a direction perpendicular to the scanning plane.

13. An optical system used for a scanning optical apparatus, comprising:

an optical system for focusing a deflectively scanned light beam on a surface, said optical system being supported by an optical box and having upside-down prevention means which interferes with a predetermined portion of said optical box to prevent upside-down mounting of said optical system, wherein said upside-down prevention means includes at least one projection which projects in a direction parallel to a scanning plane, which includes an optical axis and a scanning direction.

14. An apparatus according to claim 13, wherein said optical system has, on upper and lower end faces parallel to the optical axis and the scanning direction, reference surfaces supported by said optical box.

15. An apparatus according to claim 13, wherein said upside-down prevention means has at least one projection which projects along the optical axis.

16. An apparatus according to claim 13, wherein said upside-down prevention means has a pair of projections separated from each other in the scanning direction.

17. An apparatus according to claim 13, wherein said upside-down prevention means comprises a projection portion for positioning, which is arranged near the optical axis.

18. An optical system according to claim 13, wherein said upside-down prevention means has a pair of projections separated in a direction perpendicular to the scanning plane.

19. A scanning optical apparatus comprising:

an optical box; and an optical system for focusing a deflectively scanned light beam on a surface, said optical system being supported by said optical box and having upside-down prevention means which interferes with a predetermined portion of said optical box to prevent upside-down mounting of said optical system, wherein said upside-down prevention means includes at least one projection which projects in a direction parallel to a scanning plane, which includes an optical axis and a scanning direction.

20. An apparatus according to claim 19, wherein said optical system has, on upper and lower end faces parallel to the optical axis and the scanning direction, reference surfaces supported by said optical box.

21. An apparatus according to claim 19, wherein said upside-down prevention means has at least one projection which projects along the optical axis.

22. An apparatus according to claim 19, wherein said upside-down prevention means has a pair of projections separated from each other in the scanning direction.

23. An apparatus according to claim 19, wherein said upside-down prevention means comprises a projection portion for positioning, which is arranged near the optical axis.

24. A scanning optical apparatus according to claim 19, wherein said upside-down prevention means has a pair of projections separated in a direction perpendicular to the scanning plane.

* * * * *

UNITED STATES PATENT AND TRADEMARK OFFICE
CERTIFICATE OF CORRECTION

PATENT NO. : 5,889,606

DATED : March 30, 1999

INVENTOR(S) : Koji TOYODA

It is certified that error appears in the above-identified patent and that said Letters Patent is hereby corrected as shown below:

ON THE COVER PAGE, items

[73] Address of Assignee: "Toyko" should read --Tokyo--.

[57] ABSTRACT: line 7, after "having" insert --an--.

COLUMN 1 line 28, "defected" should read --deflected--.

COLUMN 6 line 29, "11B" should read --11B--.

Signed and Sealed this

Seventh Day of March, 2000

Attest:

Q. TODD DICKINSON

*Attesting Officer*     Commissioner of Patents and Trademarks